Feb. 25, 1969  H. LUTZ ET AL  3,429,051
DAMPING ARRANGEMENT FOR DAMPING THE SWINGING
MOVEMENT OF A MEMBER ABOUT A SWING AXIS
Filed Sept. 8, 1965
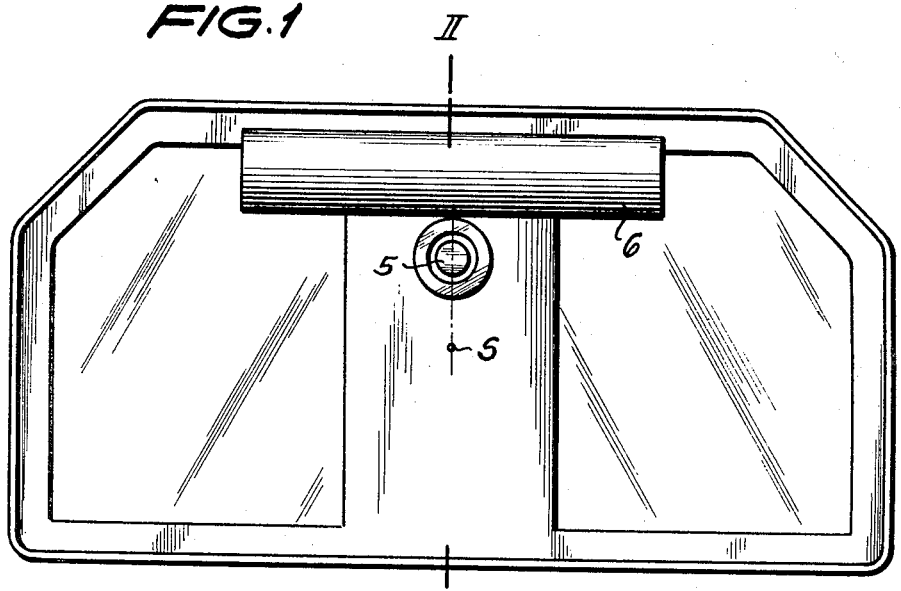
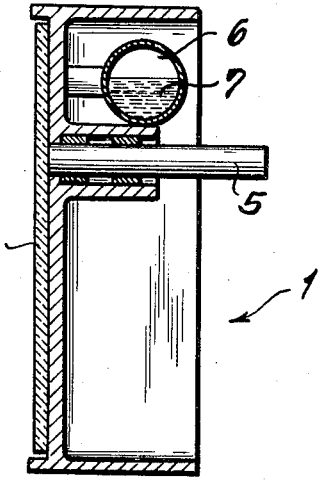
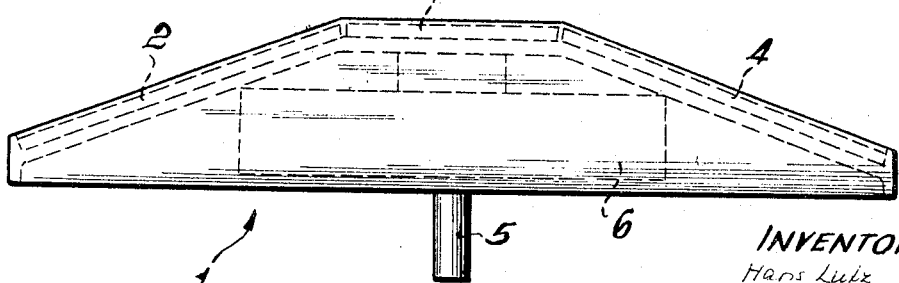
INVENTORS
Hans Lutz
Otto Gailing
Werner Klingbeil
by Michael J. Striker

United States Patent Office 3,429,051
Patented Feb. 25, 1969

3,429,051
DAMPING ARRANGEMENT FOR DAMPING THE SWINGING MOVEMENT OF A MEMBER ABOUT A SWING AXIS
Hans Lutz and Otto Gailing, Ilsfeld, and Werner Klingbeil, Heilbronn, Germany, assignors to Robert Bosch GmbH, Stuttgart, Germany
Filed Sept. 8, 1965, Ser. No. 485,766
Claims priority, application Germany, Sept. 10, 1964, B 78,507
U.S. Cl. 33—220                          9 Claims
Int. Cl. G01c 9/08, 9/00, 15/12

ABSTRACT OF THE DISCLOSURE

An elongated container fixed to a pendulous body above the swing axis of the latter and partly filled with damping liquid so that during swinging of the pendulous body to opposite sides from its rest position, the liquid in the elongated container will flow to the respective end of the container to dampen the swinging movement of the pendulous body.

---

The present invention relates to a damping arrangement for damping the swinging movement of a body, especially of a mirror serving to measure the angular position of wheels of a motor vehicle or the like, and in which a container partially filled with a damping liquid is secured for swinging with the body about a swing axis.

Arrangements for damping the rolling and pitching movement of a ship, or for damping the oscillating movement of measuring instruments are known in the art.

Such damping arrangements known in the art include a container with more or less curved inner surfaces and provided between its ends with a restriction which during swinging movement of the container will retard flow of the damping liquid in the interior of the container from one to the other side of the restriction. These known damping arrangements are relatively complicated and therefore relatively expensive to produce.

It is an object of the present invention to provide a damping arrangement of the aforementioned kind which is improved and simplified relative to the damping arrangements known in the art.

It is an additional object of the present invention to provide for a damping arrangement which is composed of relatively few and simple parts so that the damping arrangement may be produced at reasonable cost and will stand up perfectly under extended use.

With these objects in view, the damping arrangement according to the present arrangement mainly comprises a body, means mounting the body above the center of gravity thereof for swinging movement about a swing axis, and damping means for damping any swinging movement of the body about the axis, in which the damping means comprise an elongated tubular container having opposite closed ends and being fixed to the body for swing movements therewith. The container has in a longitudinal cross-section thereof a rectangular configuration and transverse thereto inner cross-sectional areas which are the same over the whole length thereof, and is partly filled with a damping liquid. The tubular container is preferably fixed to the body above the center of gravity thereof with the longitudinal axis of the elongated tubular container extending in a rest position of the body substantially horizontally and transverse to the swing axis thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a rear view of the damping arrangement according to the present invention in which the body is in form of a mirror adapted to be used in combination with a measuring instrument for measuring the angular position of wheels of a motor vehicle or the like;

FIG. 2 is a cross-section of the arrangement shown in FIG. 1 and taken along the line II–II of FIG. 1; and FIG. 3 is a top view of the arrangement shown in FIG. 1.

Referring now to the drawings, it will be seen that the arrangement according to the present invention mainly comprises an elongated body 1, which in the specific construction illustrated in the drawings carries at the front side three mirrors 2, 3 and 4. The body 1 is provided above the center of gravity S thereof with a bushing arranged substantially normal to the central mirror 3 in which a bolt 5 is turnably mounted but prevented from moving in axial direction. The end of the bolt 5 projecting toward the right, as viewed in FIG. 2 beyond the body is adapted to be fixedly secured in a holding member. This holding member, not shown in the drawing, can be attached in any convenient manner to the rim of the wheel of a motor vehicle or the like so that the mirror may serve in combination with a measuring apparatus for measuring the angular position of the wheels of a motor vehicle.

In order to shorten the time of the measurement, it is necessary to provide the mirror body with damping means, which according to the present invention are to be kept as simple as possible. As can be seen from the drawings, and especially from FIG. 1 of the same, the damping means according to the present invention simply comprises an elongated tubular container closed at the opposite ends thereof, which has in axial direction a rectangular cross-section and in a direction normal to its axis an inner cylindrical cross-section which is uniform over the whole length of the tubular container 6. The interior of the tubular container 6 is partly filled, for instance up to 65%, with a damping liquid 7, which is preferably silicon oil, for instance an oil brought on the market by the German company Bayer under the designation M100. The ratio of the mass of damping liquid in the tubular container 6 to the mass of the body including the mirrors mounted thereon is preferably about 1:20 and in an actually constructed embodiment the mass of the silicon oil filled in the tubular body 6 was 95 gr., whereas the total mass of the body 1 was 1,865 gr.

The tubular container 6 in a built embodiment has an inner diameter of 36 mm. and a length of 220 mm., whereas the greatest width of the body 1 is about 410 mm. Therefore the ratio of the length of the tubular container 6 to the maximum width of the body 1 is about 1:2, whereas the ratio of the length of the tubular container 6 to its interior diameter is about 17:3.

The tubular container 6 is mounted about 40 mm. above the axis of the bolt 5 on which the body 1 is tiltably mounted and the tubular container is mounted on the body 1 in such a manner that the longitudinal axis of the tubular cotnainer 6 in the rest position of the body 1 is substantially horizontal and normal to the axis of the bolt 5. The bolt 5 is arranged with respect to the center of gravity S of the body 1 in such a manner that the distance between the axis of the bolt 5 and the center of gravity S of the body 1 is substantially the same as the distance between the axis of the bolt 5 and the longitudinal axis of the tubular container 6.

Whereas in the known damping arrangements the restriction provided therein throttles the flow of the damping liquid from one to the other side of the container in which the damping liquid is provided so that the known damping arrangements will dampen already the first tilting movement of the body or pendulum to which they are connected, the damping means according to the present invention will act aspecially strong only during the return movement of the body or pendulum to which it is connected and will then act mainly in a dynamic manner. The damping action produced by the arrangement of the present invention is especially strong during passage of the body to which the damping means are connected through its zero position so that the body will be brought at a relatively very short time into its rest position.

It will be understood that each of the elements described above, or two or more together, may also find a useful application in other types of damping arrangements differing from the type described above.

While the invention has been illustrated and described as embodied in a damping arrangement for damping the swinging movement of a member about a swing axis, it is not intended to be limited to the details shown, since various modifications and structural changes may be made without departing in any from the spirit of the present invention.

What is claimed as new and desired to be secured by Letter Patent is:

1. In combination with a pendulous body supported for swinging movement about a swing axis to opposite sides of a rest position, damping means for damping any swinging movement of said body about said swing axis and comprising a substantially unconstricted and substantially straight elongated tubular container having opposite closed ends and a length being a multiple of the maximal transversal dimension of said tubular container and being fixed to said body above the center of gravity of the latter with the longitudinal axis of said elongated tubular container extending transverse to the swing axis and in said rest position of said body substantially horizontally; and a damping liquid only partly filling said container to an extent to form in said rest position of said body a free liquid level extending throughout the length of said container.

2. Damping means as set forth in claim 1, wherein the ratio of the mass of damping liquid in the container to the mass of said body is about 1:20.

3. Damping means as set forth in claim 1, wherein said damping liquid is silicon oil.

4. Damping means as set forth in claim 1, wherein the ratio of the length of said tubular container to the inner diameter thereof is about 17:3.

5. Damping means as set forth in claim 1, wherein said body has a maximum dimension in the direction of the axis of said tubular container and wherein the ratio of the length of said tubular container to said maximum dimension of said body is about 1:2.

6. Damping means as set forth in claim 1, wherein said tubular container is fixed to said body above the center of gravity of the latter and above said swing axis.

7. Damping means as set forth in claim 6, wherein the longitudinal axis of said tubular container is spaced from said swing axis a distance substantially equal to that at which said swing axis is spaced from said center of gravity of said body.

8. Damping means as set forth in claim 1, wherein said damping liquid fills substantially 65% of the interior of said tubular container.

9. Damping means as set forth in claim 1, wherein said body includes at least one mirror adapted to be used for measuring the angular position of wheels of a motor vehicle.

References Cited
UNITED STATES PATENTS

| | | | |
|---|---|---|---|
| 975,830 | 11/1910 | Carr | 33—219 |
| 1,014,519 | 1/1912 | Roake | 33—210 X |
| 1,135,163 | 4/1915 | Denney | 33—210 |
| 1,923,885 | 8/1933 | Rawlings | 33—226.5 |
| 3,055,264 | 9/1962 | Hunter. | |
| 3,288,020 | 11/1966 | Lill. | |
| 3,321,841 | 5/1967 | Kawada | 33—226.5 |

FOREIGN PATENTS

| | | |
|---|---|---|
| 13,759 | 1899 | Great Britain. |
| 382,451 | 10/1932 | Great Britain. |

WILLIAM D. MARTIN, JR., *Primary Examiner.*

U.S. Cl. X.R.

33—46, 210